United States Patent [19]

Steigerwald

[11] 4,424,557
[45] Jan. 3, 1984

[54] FULL BRIDGE PWM INVERTER WITH DISTRIBUTED DEVICE SWITCHING

[75] Inventor: Robert L. Steigerwald, Scotia, N.Y.

[73] Assignee: General Electric Company, Schenectady, N.Y.

[21] Appl. No.: 334,843

[22] Filed: Dec. 28, 1981

[51] Int. Cl.³ ..................... H02P 13/20; H02M 7/537
[52] U.S. Cl. ........................................ 363/98; 307/46; 363/41; 363/132
[58] Field of Search ........................ 363/17, 80, 98, 41, 363/132; 323/300, 906; 307/45, 46; 320/32, 35

[56] References Cited

U.S. PATENT DOCUMENTS

| | | | |
|---|---|---|---|
| 3,614,590 | 10/1971 | Kernick | 363/71 |
| 3,710,229 | 1/1973 | Jessee | 363/41 |
| 3,913,002 | 10/1975 | Steigerwald et al. | 321/2 |

FOREIGN PATENT DOCUMENTS 53-16831  2/1978  Japan .................................. 363/132

OTHER PUBLICATIONS

Conference; INTELEC '79, International Telecommunications Energy Conference, Wash., D.C. (USA)(Nov. 26–29, 1979).

Primary Examiner—William H. Beha, Jr.
Attorney, Agent, or Firm—William H. Steinberg; James C. Davis, Jr.; Marvin Snyder

[57] ABSTRACT

Method and apparatus for evenly distributing the switching duty among power transistors in a full bridge inverter controlled by current band PWM, by switching first the top half of the bridge and then the lower half of the bridge to shape the output current waveform.

2 Claims, 2 Drawing Figures

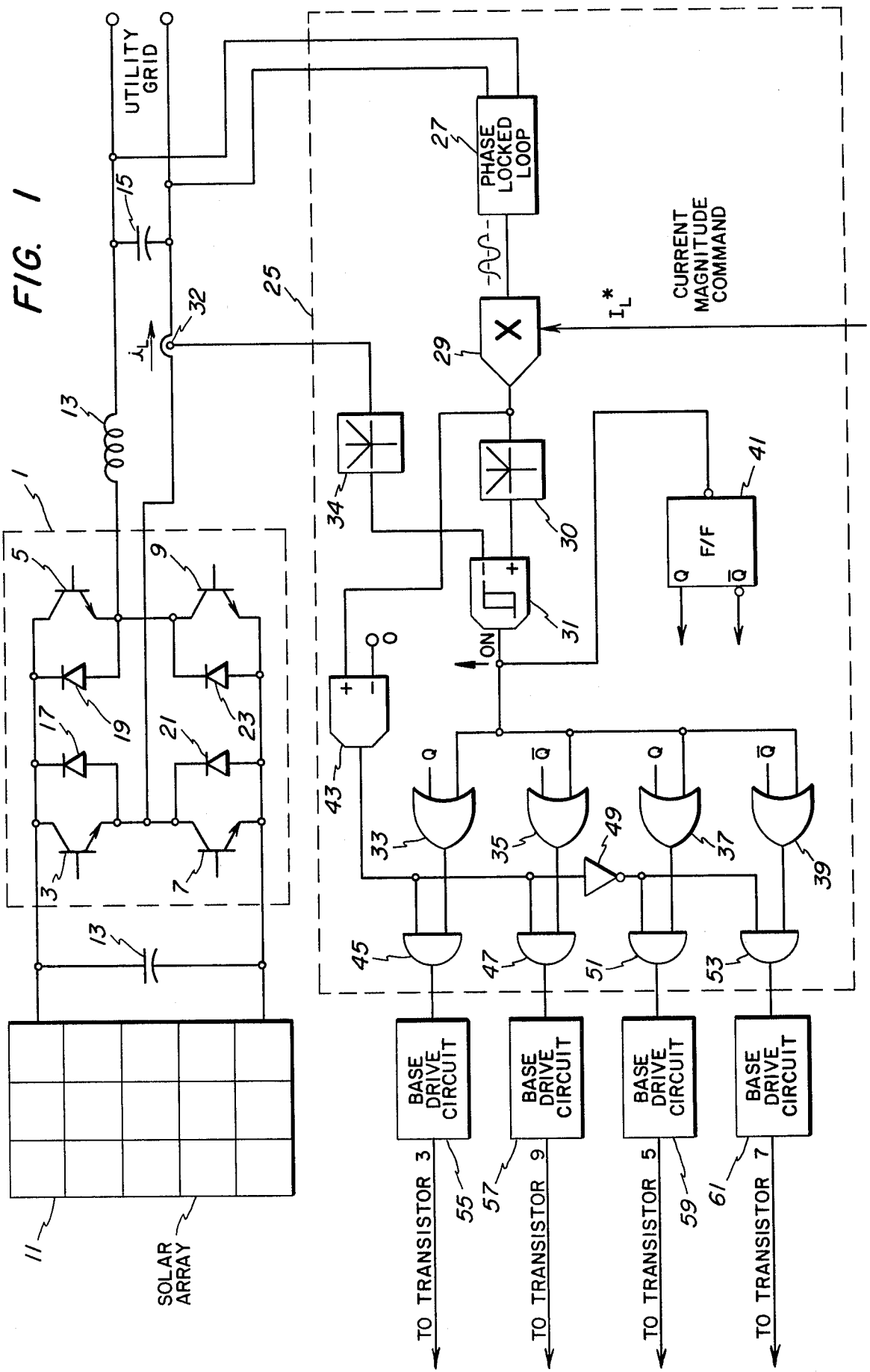

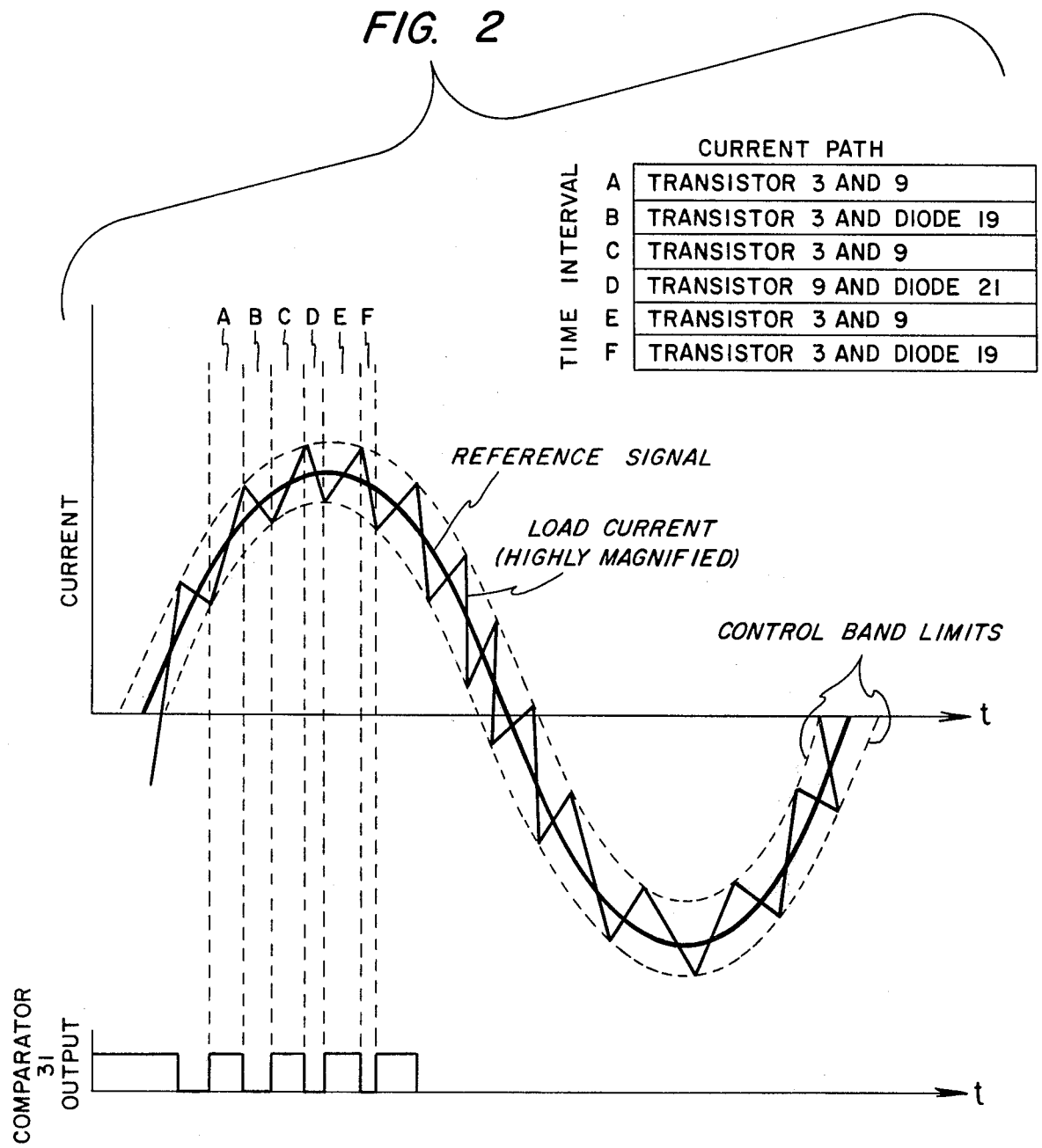

– 4,424,557 –

FULL BRIDGE PWM INVERTER WITH DISTRIBUTED DEVICE SWITCHING

This invention relates to a method and apparatus for switching full bridge current controlled power inverter.

Current controlled power inverters are devices used to change direct current into variable frequency and variable magnitude ac current. Usually, one semiconductor switching device switches for a given output polarity to shape the output waveform for that polarity. Switching losses can be 50 to 80% of the total losses of the inverter. The expected life of the semiconductor switching devices decreases exponentially with increasing junction temperature of the switching devices. Junction temperature is dependent on the amount of current switched and with frequency at which the switch is operated. High frequency switching is desirable to improve the quality of the output waveform (reduce harmonic content) but it results in higher junction temperatures as the same current is switched at increasing frequency.

It is an object of the present invention to increase the life of switching devices by achieving lower switching device junction temperatures while obtaining higher frequency switching capability in a full bridge inverter controlled by current band pulse width modulation.

SUMMARY OF THE INVENTION

In one aspect of the present invention a method of switching a full bridge inverter controlled by current band pulse width modulation is provided which evenly distributes the switching duty among the switching devices. The full bridge inverter has a first and second upper switching device and a first and second lower switching device. The first upper and second lower switching devices provide a current path from a dc source through the load in a first direction and the second upper and the first lower switching devices provide a path from the dc source to the load in a second direction opposite to the first. The first upper switching device and the second lower switching device are alternately switched by pulse width modulated pulses to cause current to flow in a first direction through the load. The second upper switching device and the first lower switching device are alternately switched by pulse width modulated pulses to cause current to flow through the load in a second direction.

In another aspect of the present invention, apparatus for evenly distributing the switching duty in a full bridge current inverter is provided. The full bridge inverter has a first and second upper switching device and a first and second lower switching device. The first upper and second lower switching devices provide a current path from the dc source through the load in a first direction and the second upper switching device in the first lower switching device provide a path from the dc source through the load in a second direction opposite the first. PWM switching signals are provided by comparing a reference waveform to the actual output current. A circuit is provided for determining the desired direction of current flow through the load from the generated reference waveform. The PWM signal is alternately connected to the first upper switching device and second lower switching device when the desired direction of current flow in the load is determined to be in a first direction. The PWM signal is alternately connected to the second upper switching device and the first lower switching device when the detected desired direction of current flow in the load is in the second direction.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

FIG. 1 is a part schematic, part block diagram representation of a full bridge PWM current inverter with distributed device switching in accordance with the present invention; and FIGS. 2A and B are waveform diagrams helpful in explaining the operation of FIG. 1.

DETAILED DESCRIPTION OF THE INVENTION

Referring now to FIG. 1, a full bridge current controlled inverter 1 has two upper gate controlled switching devices shown as bipolar NPN transistors 3 and 5 and two lower gate control switching devices shown as NPN transistors 7 and 9. Transistors 3 and 7 are connected in series across a dc source which could be a battery bank or the output of a full wave rectifier, but shown in the preferred embodiment as a solar array 11. A filter capacitor 13 is connected across the array. Upper transistor 3 is connected in series with lower transistor 7, with the series combination connected across the array output. The emitter of transistor 3 is connected to the collector of transistor 7 and also to one side of a load which in the present embodiment is a utility grid. Upper transistor 5 and lower transistor 9 are also in series, with the series combination connected across the array. The emitter of transistor 5 is connected to the collector of transistor 9 and also through a high frequency inductor 13 to the other end of the load. Also connected across the load is a high frequency filter capacitor 15. Each of the transistors 3, 5, 7 and 9 in the inverter has a diode 17, 19, 21 and 23, respectively, connected in parallel with it to carry reverse current. The anode of each diode is connected to the emitter of the transistor it is in parallel with. A control 25 provides switching signals to the transistors in the full bridge current controlled inverter. A reference waveform generator here shown as a phased lock loop receives the voltage signal from the utility grid. The output of the phase locked loop is connected to a variable gain amplifier 29 which changes its gain in response to a current magnitude command. The commanded reference from the output of the variable gain amplifier is passed through an absolute value circuit 30 and provided at one input of a comparator 31 having hysteresis and a feedback signal of inverter output current from a current sensor 32 is passed through an absolute value circuit 33 and is provided at the other input of the comparator 31. The output of comparator 31 is provided to one input of each of four two input OR gates 33, 35, 37 and 39. The output of the comparator 31 also clocks a toggle flip-flop 41. Flip-flop 41 has two complmentary outputs of opposite logic states. The first output of flip-flop 41 is connected to the other input of OR gates 33 and 37 and the second output of flip-flop 41 is connected to OR gates 35 and 39. The output of variable gain amplifier 29 is also connected to one input of a comparator 43. The other input receives a zero magnitude reference. The output of the comparator 43 is connected to an input of AND gate 45 and 47. The other input to AND gate 45 and 47 is the output of OR gate 33 and 35, respectively. The output of comparator 43 is inverted in logic inverter 49 and connects to one input of AND gate 51 and 53. The other input of AND gate 51 and 53 is supplied by the output of OR gates 37 and 39, respectively. AND gate 45 is connected through a base drive circuit 55 to the base of upper transistor 3. The output of AND gate 47 is connected through a drive circuit 57 to the base of lower transistor 9. The output of AND gate 51 is connected through base drive circuit 59 to the base of upper transistor 5. The output of AND gate 53 is connected through base drive circuit 61 to the base of lower transistor 7.

The operation of the circuit of FIG. 1 will now be explained with reference to FIGS. 1 and 2. In general, a function generator provides the desired waveform shape of the output current of the inverter and is applied to the input of variable gain amplifier 29. In the embodiment shown a phased locked loop 27 is used to generate a sinusoidal waveform at the input of variable gain amplifier 29 since it is desired to feed a sinusoidal current in phase with the voltage to a utility grid. However, an independent function generator could be used if synchronization of the output of the inverter with the power source connected to the load is not desired or necessary or the load is not also a power source. The magnitude of the reference waveform is adjusted by a current magnitude command in the variable gain amplifier 29. A current magnitude command can be obtained from the circuit shown in my copending application Ser. No. 334,845 assigned to the same assignee as the present invention. The current command shown in the copending application is suitable for situations where the full bridge inverter is connected to a solar array and the inverter is providing sinusoidal power to a utility grid. The copending application is hereby incorporated by reference. The output of the variable gain amplifier 29 is a magnitude adjusted output waveform current command which is compared to the actual output current of the inverter in comparator 31. Comparator 31 operates with hysteresis so that the actual current is compared to a desired current band as shown in FIG. 2A. The current band is shown much wider than occurs in practice to show the switching of the power transistor. Also shown in FIG. 2A is the output pulses of comparator 31. When the actual output current decreases below the lower reference band, the output of the comparator goes high and when the actual output current exceeds the upper reference band, the comparator output goes low. Each of the OR gates 33, 35, 37 and 39 receive at one input the output of the comparator 31. The output of the comparator 31 is also connected to a toggle flip-flop which is triggered by the negative going edge of the pulse out of comparator 31. One output of the flip-flop is connected to the other input of OR gate 33 and 37. The inverted output of the flip-flop is connected to the other input of OR gates 35 and 39. When the output of comparator 31 is high, all of the OR gates are enabled and each of the OR gates provides an input to its respective AND gate 45, 47, 51 and 53. The other input to AND gate 45 and 47 is the output of comparator 43 which determines whether the commanded waveform desired is positive or negative. When the waveform is positive, a high pulse is provided by comparator 43. AND gates 51 and 53 receive the logically inverted output of the comparator 43. Assuming for the moment that the commanded waveform is positive, gates 45 and 47 are enabled allowing transistors 3 and 9 to be biased into conduction and provide a path for current from the dc source through transistor 3 to the load in a first direction and back through transistor 9 to the load. When the current flowing in the inverter output exceeds the upper reference band, the output of comparator 31 goes low causing flip-flop 41 first and second outputs each to change state and then either OR gates 33 and 37 or OR gates 33 and 39 to be enabled. AND gates 51 and 53 remain unenabled and therefore depending on the present state of the output of the flip-flop 41 either transistor 3 or 9 is biased out of conduction. Current and therefore power is no longer supplied by the dc source and current flowing in either transistor 3, the load and diode 19, if transistor 9 was turned off, or current flowing in transistor 9, the load and diode 21 if transistor 3 was turned off, decays until the lower reference band is crossed causing the comparator output again to go high turning on both transistors 9 and 3 as before. This time, however, when the actual current exceeds the upper reference band the comparator output will cause the flip-flop to again toggle causing transistor 3 to be biased out of conduction if it was not switched the preceding time or if transistor 9 was not switched the previous time the flip-flop was triggered it will be biased out of conduction. Thus, the frequency at which the transistors are switched is half of what it would be in a conventional scheme where one transistor provides the pulse width modulation for each polarity of the output. When the reference waveform becomes negative, AND gates 45 and 47 are disabled and AND gates 51 and 53 receive a high input and are enabled when the associated OR gate is enabled. The flip-flop output again spreads the switching this time between transistors 5 and 7. If a unidirectional output waveform is desired the switching would be handled by just two transistors either 5 and 7 or 3 and 9 depending on the desired direction of current flow.

Since the switching is handled by twice the number of switching devices, twice the junction area is available and therefore one-half the temperature rise occurs. However, since losses are disproportionately higher at higher junction temperatures, a decrease of more than half the temperature rise can be expected. In addition to the reduction of junction temperature and the resulting increase in switch life, the frequency the switches operate at is cut in half allowing higher frequencies to be achieved at the load with each of the switches switching at half the load frequency.

The foregoing describes a full bridge inverter controlled by current band PWM which increases the life of the switching elements by achieving lower switch junction temperature while obtaining higher frequency switching capabilities.

It is understood that the foregoing detailed description is given merely by way of illustration and that many modifications may be made therein without departing from the spirit or scope of the present invention.

What is claimed is:

1. A control for a full bridge current inverter, said inverter having a first upper and a first lower switching device connected in series across an external dc source and a second upper and a second lower switching device connected in series across the external dc source, the output of said inverter being available between said series connected upper and lower switching devices, each of said switching devices connected in inverse parallel with a diode to carry reverse currents, said control comprising:

current measuring means for providing a signal proportional to the inverter output current;

commanded reference waveform generating means for providing a current reference waveform signal;

switching signal generating means for comparing with hysteresis the inverter output current signal and the reference waveform signal for generating a first switching signal, when the inverter output current signal exceeds the reference waveform signal by a predetermined amount and for generating a second signal when the inverter output current signal is less than the reference waveform signal by a predetermined amount;

flip-flop means responsive to said switching signal transitions so that said flip-flop is in a different state when each successive first switching signal is generated;

signal polarity sensing means responsive to said reference waveform signal for determining the commanded direction of output current flow;

means responsive to said signal polarity sensing means and said switching signal generating means for biasing into conduction said first upper switching device and said second lower switching device when the output current is commanded to flow in a first direction and said inverter load current signal is less than said reference waveform by a predetermined amount, and biasing into conduction said first lower switching device and said second upper switching device when the output current is commanded to flow in a second direction opposite to the first and said inverter load current signal is less than said reference waveform by a predetermined amount; and means responsive to said flip-flop means, said signal polarity sensing means and said switching signal generator for biasing out of conduction one of the two conduction switching devices when said inverter load current signal exceeds said reference waveform by a predetermined amount, so that alternate ones of said two conducting switching devices are biased out of conduction every time said inverter output current exceeds the reference waveform signal by a predetermined amount thereby distributing the switching duty among the switching devices.

2. A method for controlling a full bridge current inverter having a first upper and a first lower switching device connected in series across an external dc source and a second upper and a second lower switching device connected in series across the external dc source, the output of said inverter being available between said series connected upper and lower switching devices, each of said switching devices connected in inverse parallel with a diode to carry reverse currents, said method comprising the steps of:

measuring the inverter output current;

generating a commanded current reference waveform signal;

comparing with hysteresis the inverter output current signal with the reference waveform signal for generating a first switching signal when the inverter output current signal exceeds the reference waveform signal by a predetermined amount and for generating a second signal when the inverter output current signal is less than the reference waveform signal by a predetermined amount;

sensing the signal polarity of said reference waveform to determine the commanded direction of output current flow;

biasing into conduction a first upper switching device and said second lower switching device when the output current is commanded to flow in a first direction and said inverter load current signal exceeds said reference waveform by a predetermined amount, and biasing into conduction said first lower switching device and said second upper switching device when the output current is commanded to flow in a second direction opposite to the first and said inverter output current signal exceeds said reference waveform by a predetermined amount; and biasing out of conduction an alternate one of the two conducting switching devices every time said inverter output current signal is less than said reference waveform by a predetermined amount thereby distributing the switching duty among the switching devices.

\* \* \* \* \*